(12) United States Patent
Shirahata et al.

(10) Patent No.: US 7,817,164 B2
(45) Date of Patent: Oct. 19, 2010

(54) IMAGE EDITING DEVICE AND METHOD THEREOF

(75) Inventors: Takashi Shirahata, Chiba (JP); Yoshihiro Goto, Tokyo (JP)

(73) Assignee: Hitachi Medical Corporation, Tokyo (JP)

( * ) Notice: Subject to any disclaimer, the term of this patent is extended or adjusted under 35 U.S.C. 154(b) by 1037 days.

(21) Appl. No.: 11/578,638

(22) PCT Filed: Apr. 27, 2005

(86) PCT No.: PCT/JP2005/007956

§ 371 (c)(1),
(2), (4) Date: Oct. 17, 2006

(87) PCT Pub. No.: WO2005/104041

PCT Pub. Date: Nov. 3, 2005

(65) Prior Publication Data

US 2007/0273934 A1 Nov. 29, 2007

(30) Foreign Application Priority Data

Apr. 27, 2004 (JP) .............................. 2004-131881

(51) Int. Cl.
G09G 5/00 (2006.01)

(52) U.S. Cl. .................. 345/619; 345/620; 345/629
(58) Field of Classification Search ................ 345/619, 345/620, 629
See application file for complete search history.

(56) References Cited

U.S. PATENT DOCUMENTS

| | | | | |
|---|---|---|---|---|
| 5,570,404 A | * | 10/1996 | Liang et al. | 378/8 |
| 5,923,793 A | * | 7/1999 | Ikebata | 382/311 |
| 6,459,442 B1 | * | 10/2002 | Edwards et al. | 715/863 |
| 2004/0061889 A1 | * | 4/2004 | Wood et al. | 358/1.15 |

FOREIGN PATENT DOCUMENTS

| | | |
|---|---|---|
| JP | 06-111000 | 4/1994 |
| JP | 07-168951 | 7/1995 |
| JP | 07-182519 | 7/1995 |

OTHER PUBLICATIONS

Igarashi et al., "Teddy: A Sketching Interface for 3D Freeform Design", SIGGRAPH 99, p. 409-416.*

* cited by examiner

*Primary Examiner*—Michelle K Lay
(74) *Attorney, Agent, or Firm*—Cooper & Dunham LLP

(57) ABSTRACT

Systems and methods for adding to or deleting from an attention region in a medical image using a drawn curved line depending on the positions of the end points of the line using computer processing and user interface.

20 Claims, 17 Drawing Sheets (A)

(B)

(A)

(B)

(A)

(B)

(A)

(B)

(A)

(B)

IMAGE EDITING DEVICE AND METHOD THEREOF

FIELD OF THE INVENTION

The present invention relates to a technique for drawing images interactively at the request of an operator, and deleting or adding discretional regions corresponding to the displayed images using an input device such as a mouse.

DESCRIPTION OF RELATED ART

Existing methods for image editing are carried out using a pointing device such as a mouse and tools such as pencil tool or eraser tool, by displaying traces of mouse pointer passing through the image with curves as if the mouse is moving on a canvas, erasing a part of the image where the mouse pointer passed through, or painting the region encompassed by a curve with a predetermined color.

An image-editing device comprising such functions is disclosed in Patent Document 1.

Patent Document 1: JP-A-1993-205020

However, the method disclosed in Patent Document 1 is to be implemented, first by displaying a predetermined closed-region image based on the image data presented on a bitmap, then designating the contour line part of this closed-region image as well as inputting the number of pixels for adding or deleting along its contour line part, and adding or deleting a predetermined number of pixels in a normal direction along its contour line in relation to the closed-region image. With this method, a closed-region image must be created in every case of adding or deleting a discretional region with regard to the image once drawn, and the operation for creating the closed-region image is complicated.

BRIEF SUMMARY OF THE INVENTION

An image-editing device of the present invention comprises:

display means for displaying an image having a plurality of pixel value regions including an attention region;

setting means for setting a graphic passing through the attention region and at least one region different from the attention region on the image; and control means for judging which of the regions contains the ending-point of the graphic which has been set, executing extension or deletion of the attention region according to the graphic and the judgment result, and causing the display means to display the region extended or deleted as a new attention region.

In accordance with the above-mentioned means, an image editing device that is feasible with simple operation for drawing images or correction such as deleting or adding of the drawn region can be provided.

The image-editing device of the present invention also includes:

a step for displaying an image having a plurality of pixel value regions including an attention region;

a step for setting a graphic passing through the attention region and at least one region different from the attention region;

a step for judging which of the region contains the ending-point of the set graphic;

a step for executing either extension or deletion of the attention region according to the graphic and the judgment result by the judging step; and a step for displaying the region extended or deleted as a new attention region.

In accordance with the above-mentioned steps, an image editing device that is feasible with simple operation for drawing images or correction such as deleting or adding of the drawn region can be provided.

In accordance with the present invention, it is feasible to produce an image-editing device with simple operation for drawing images or correction such as deleting or adding of the drawn region.

DETAILED DESCRIPTION OF THE INVENTION

Hereinafter, an embodiment of the present invention will be described based on the drawings.

Figure 1:
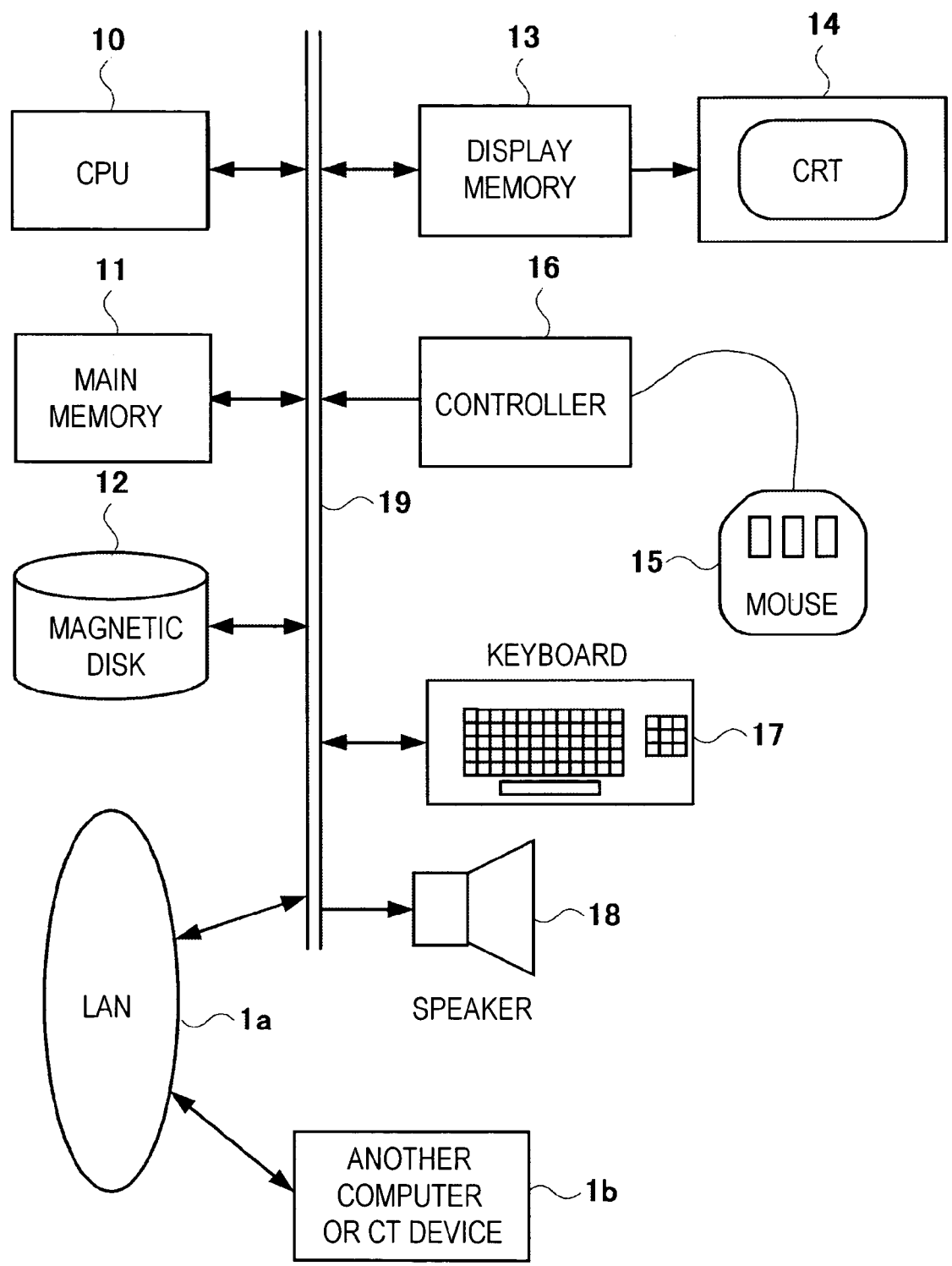
FIG. 1 is a block diagram showing the hardware configuration of the whole image-editing/display device to which the present invention is applied.

FIG. 1 is a block diagram showing a hardware configuration of the whole image-editing and display device to which the present invention is applied. This imaging-editing and display device is for processing X-ray CT images of a specified organ such as a heart. This image-editing and display device comprises:

central processing unit (CPU) 10 for controlling the respective calculations for deleting and adding calculations and the operation of the respective components;

main memory 11 for storing the intermediate steps of the drawn images or calculations upon calculation of deleting or adding regions;

magnetic disc 12 for storing a plurality of data such as tomographic data, programs, and drawn images;

display memory 13 for temporarily storing image data for display;

CRT display 14 as a display device for displaying images or result of drawing based on image data from said display memory 13;

mouse 15 and its controller 16 for an operator to execute necessary input for the editing of the regions to add or delete, or to operate a soft switch on an image;

keyboard 17 having a key or switch for setting various types of parameter;

speaker 18; and common bus 19 for connecting the above-mentioned respective components.

While a case that only magnetic disc 12 is connected as a storage device other than main memory 11 is described in this embodiment, a device other than that such as a floppy disc drive, hard disc drive, CD-ROM drive, magnetic optical disc (MO) drive, ZIP drive, PD drive or DVD drive may be connected. Furthermore, it may be arranged to be connectable to a variety of communication networks 1a such as LAN (Local Area Network), Internet or phone line via communication interface to be able to exchange image data between devices such as other computer or CT device 1b.

First Embodiment

Figure 2:
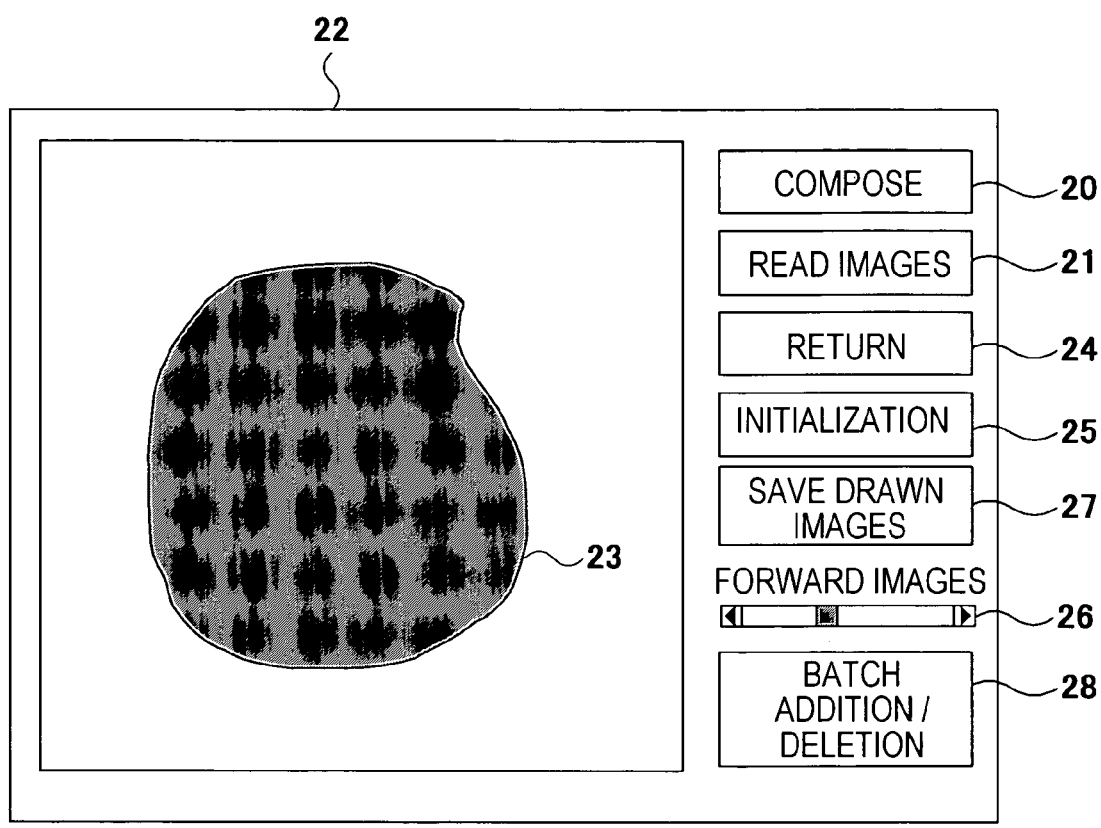
FIG. 2 is a diagram showing an example of the graphical user interface to achieve the first embodiment of the image-editing/display device relating to the present invention.

FIG. 2 is a diagram showing an example of a graphical interface to carry out the first embodiment of image-editing and display device relating to the present invention. An operator uses an input device such as mouse 15 or keyboard 17 to compose a new drawing by pushing "compose" button 20, or to read images that have already been drawn from magnet disk 12 by pushing "read image" button 21. Drawn images are displayed to drawn-image display region 22 in such manner as seen in region 23 of FIG. 2.

Figure 3:
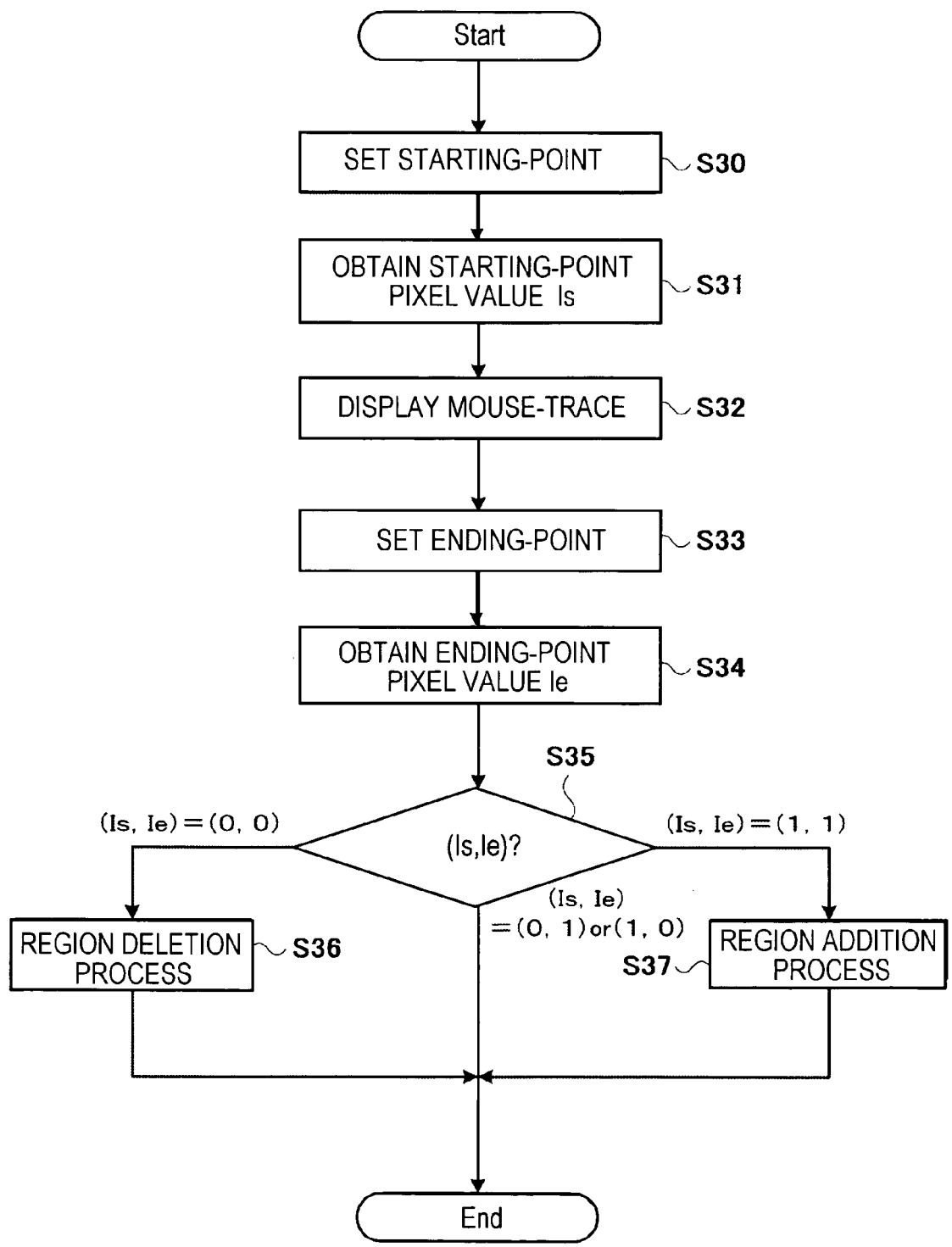
FIG. 3 is a flow chart showing the flow of the region-deleting process and region-adding process.

Next, the operator implements the region-deleting process or region-adding process to the drawn region 23 using mouse 15. The region-deleting process and region-adding process will be described referring to FIGS. 3, 4 and 5. FIG. 3 is a flow chart showing the flow of the region-deleting process and region-adding process. Each step will be described below, assuming that "1" is allotted as a pixel value to region (attention region) 23 which is drawn on main memory 11, and "0" is allotted to the other region (background region) as seen in FIG. 2.

(Step S30)

Figure 4:
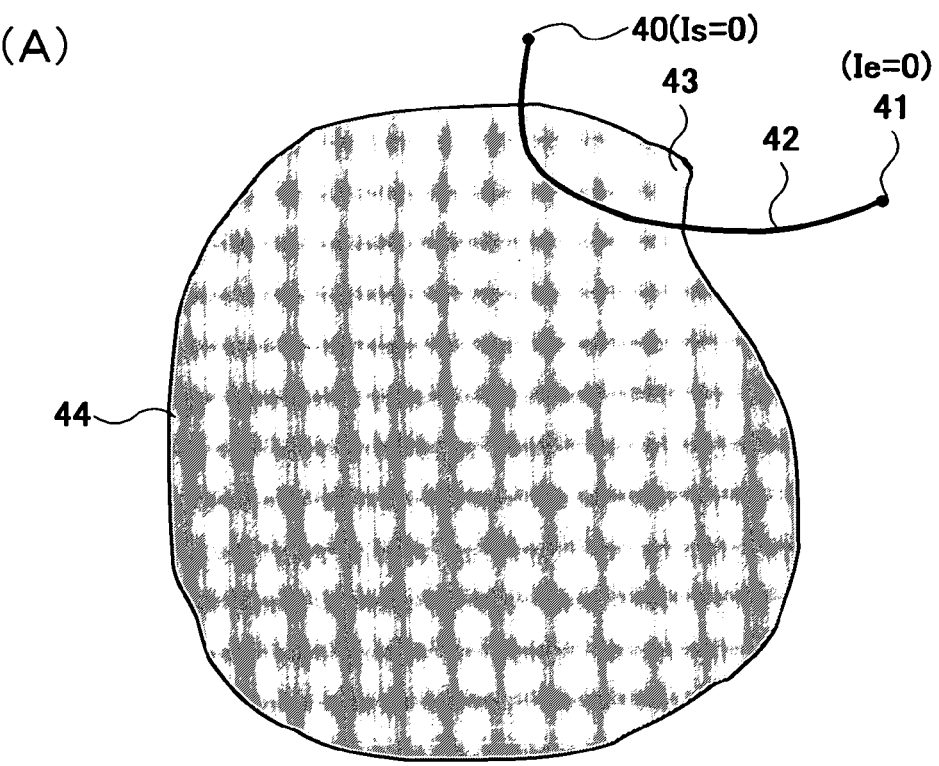
FIG. 4 is a first schematic diagram showing an operational example of the region-deleting process.
Figure 4:
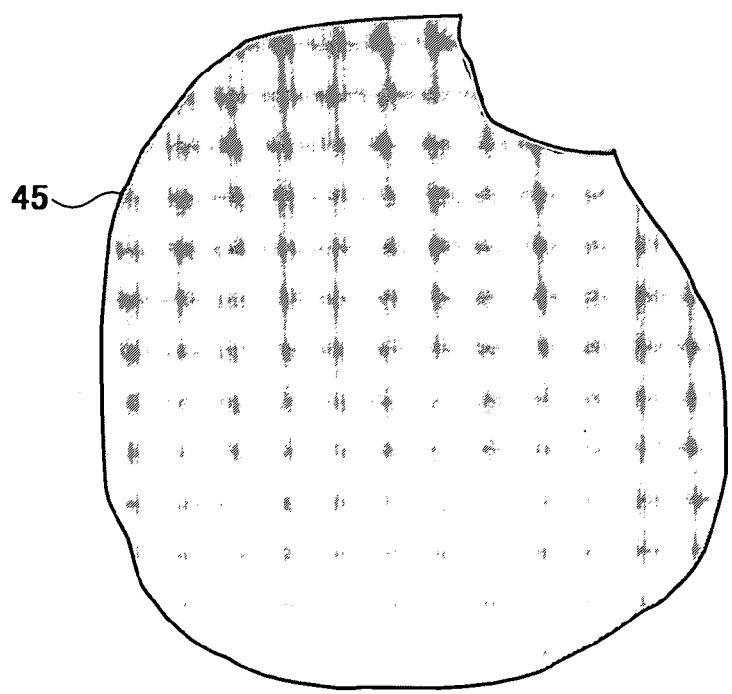

The operator clicks a discretional point on drawn-image display region 22 in FIG. 2 using mouse 15, and sets starting-point 40 as shown in FIG. 4.

(Step S31)

CPU 10 obtains pixel value $I_s$ of starting-point 40, and stores it in main memory 11.

(Step S32)

The operator moves a mouse cursor on the screen by using mouse 15. At the same time, CPU 10 displays the trace of which the mouse cursor moved from starting-point 40 as curve 42.

(Step S33)

The operator clicks mouse 15 at the point where the motion of the mouse cursor ends. The point clicked at the end of the motion is to be ending-point 41.

(Step S34)

CPU 10 obtains pixel value $I_e$ of ending-point 41, and stores it to main memory 11.

(Step S35)

CPU 10 searches for pixel value $I_e$ of starting-point 40 and pixel value $I_e$ of ending-point 41. When the combination of the pixel values are $(I_s, I_e)=(0=0)$ step S36 is to proceed, and when $(I_s, I_e)(1,1)$ step 337 is to proceed. When $(I_s, I_e)(0,1)$ or $(1,0)$ neither region-deleting process nor region-adding process is carried out, and the process is ended.

(Step S36)

CPU 10 executes the region-deleting process for deleting the designated region from the attention region by moving of the mouse cursor. FIG. 4 is a diagram showing a concrete example of the region-deleting process. As shown in FIG. 4, the ending-points of a line, for example, starting-point 40 and ending-point 41 are set through motion of the mouse cursor, and the trace of motion is displayed as curve 42. At this time, the respective areas (number of pixels) of small region 43 on the upper right-hand being cut off by curve 42 and large region 44 on the left side is measured, and the smaller region (region 43 in case of FIG. 4) is deleted. The result of the deletion is shown in FIG. 4 (B) as drawn-region 45.

It may also be set so that the smaller region (region 43) remains and the larger region (region 44) is deleted by, for example, clicking the right button of mouse 15, double-clicking mouse 15 or clicking the larger region (region 44).

Also, it may be set so that two regions 43 and 44 are displayed in different colors, and the discretional region that the operator wishes to delete can be deleted by clicking on the region with mouse 15. Instead of clicking mouse 15 on the region to be deleted, it may naturally be set so that the discretional region can remain by clicking on it.

(Step S37)

Figure 5:
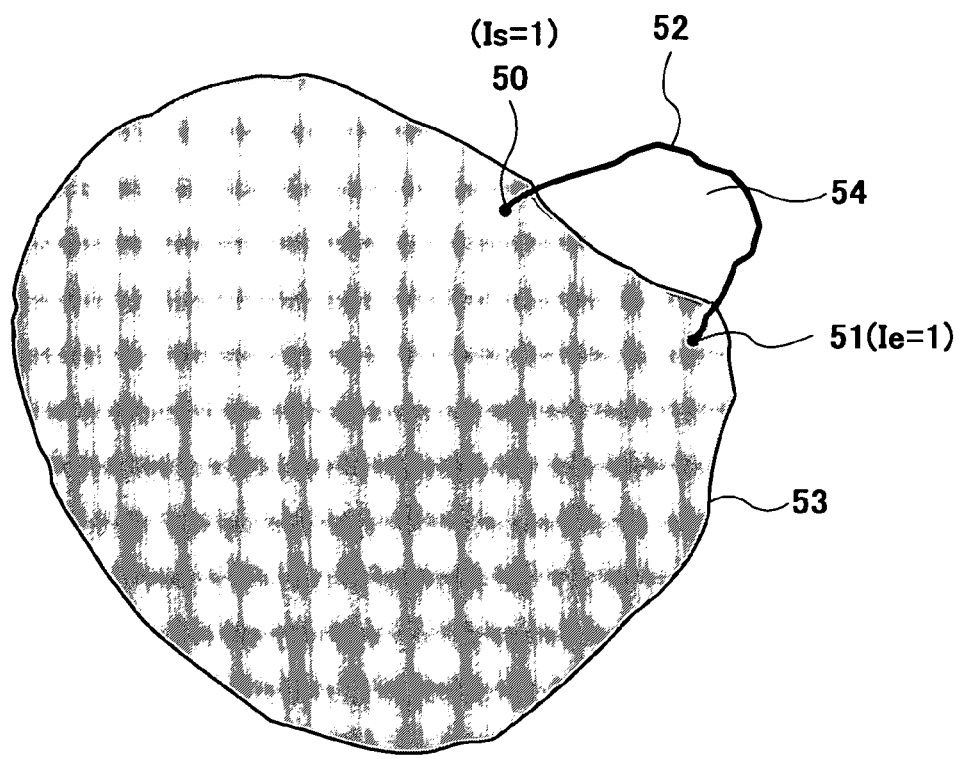
FIG. 5 is a second schematic diagram showing an operational example of the region-adding process.
Figure 5:
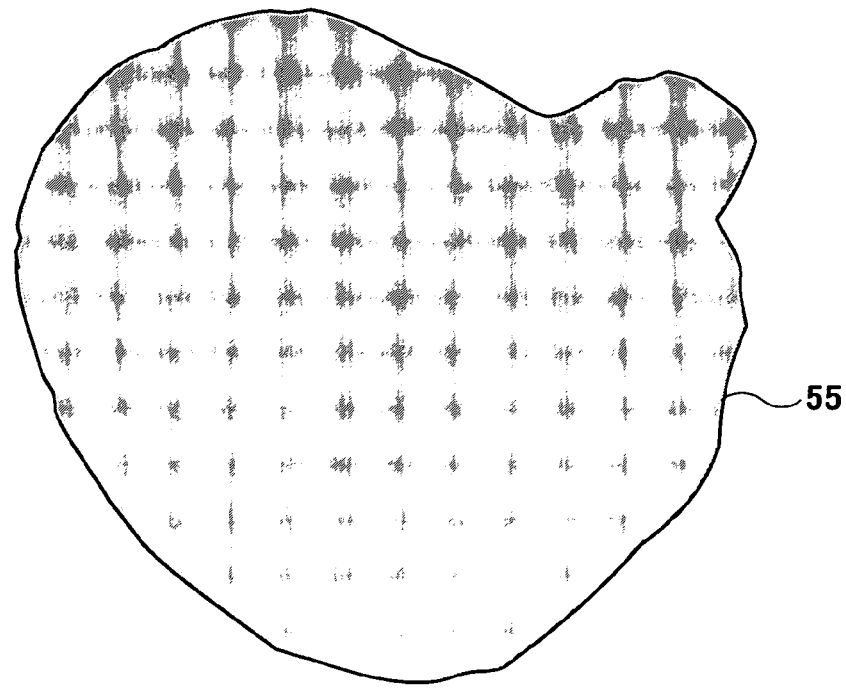

CPU 10 executes the region-adding process for adding the designated region by the moving of the mouse cursor to the original attention region. FIG. 5 is a diagram showing a concrete example of the region-adding process. As shown in FIG. 5, starting-point 50 and ending-point 51 are set by the motion of the mouse cursor, and the trace of the motion is displayed as curve 52. At this time, region 54 encompassed with curve 52 and myocardium-extracting region (attention region) 53 is set as the region to be added. Drawn-region 55 that is the result of the region-adding process is as shown in FIG. 5 (B).

When the operator deletes or adds a region different from the desired one by mistake, the drawing condition can be returned to the one before deleting or adding (undone) by pushing "return" button 24 in FIG. 2 on the display screen or right-clicking mouse 15. The number of times that it is possible to return the drawing condition by pushing the "return" button or by right-clicking mouse 15 may either be settable by users in advance or set returnable as many times as the memory permits.

Also, it is possible for the operator to return the drawn image to the condition that the drawn image was read in, through using mouse 15 by pushing "initialization" button 25.

Furthermore, when a plurality of drawn images are read in or newly created, it can be set so that the operator can display the respective images on drawn image display region 22 in a sequential order with the use of "image-forwarding" scroll bar 26 by operating mouse 15 and execute the region-deleting process or region-adding process to the respective images.

Also, the drawn images can be stored as diversified forms of images by the operator pushing the "save" button 27.

In the first embodiment, when the position of both starting-point 40 and ending-point 41 of the mouse cursor are on attention region 23 the region encompassed by curve 42 and the contour of attention region 23 is added to attention region 23, and in reverse, when the position of both starting-point 40 and ending-point 40 of the mouse cursor are outside of attention region 23 the region encompassed by curve 42 and the contour of attention region 23 is deleted from attention region 23. When only one of starting-point 40 or ending-point 40 of the mouse cursor is in attention region 23, no process is carried out.

Figure 6:
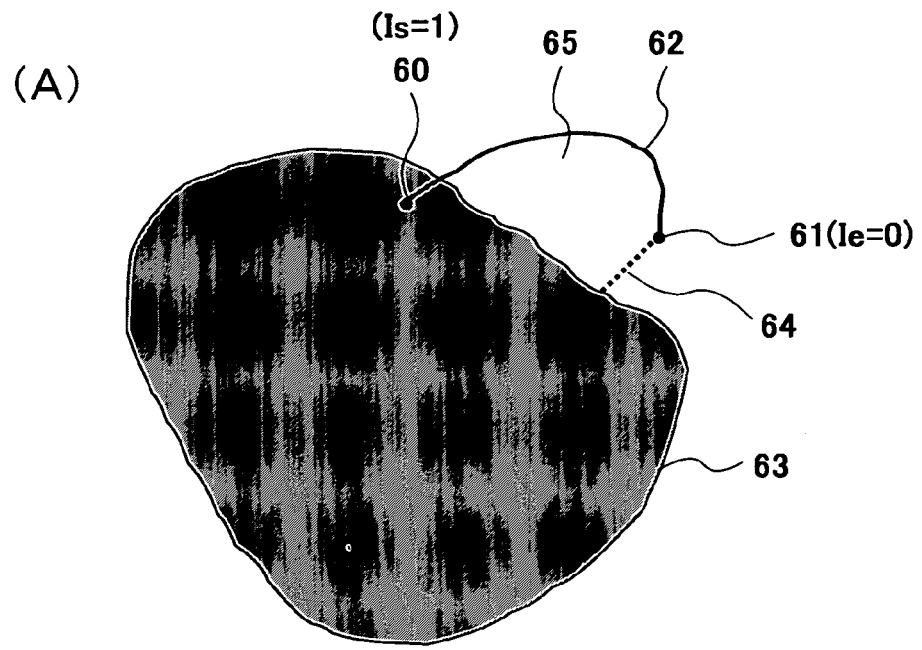
FIG. 6 is a diagram showing an example of the region-adding process in the case that only the starting-point or the ending-point of the mouse cursor is on the attention region.
Figure 6:
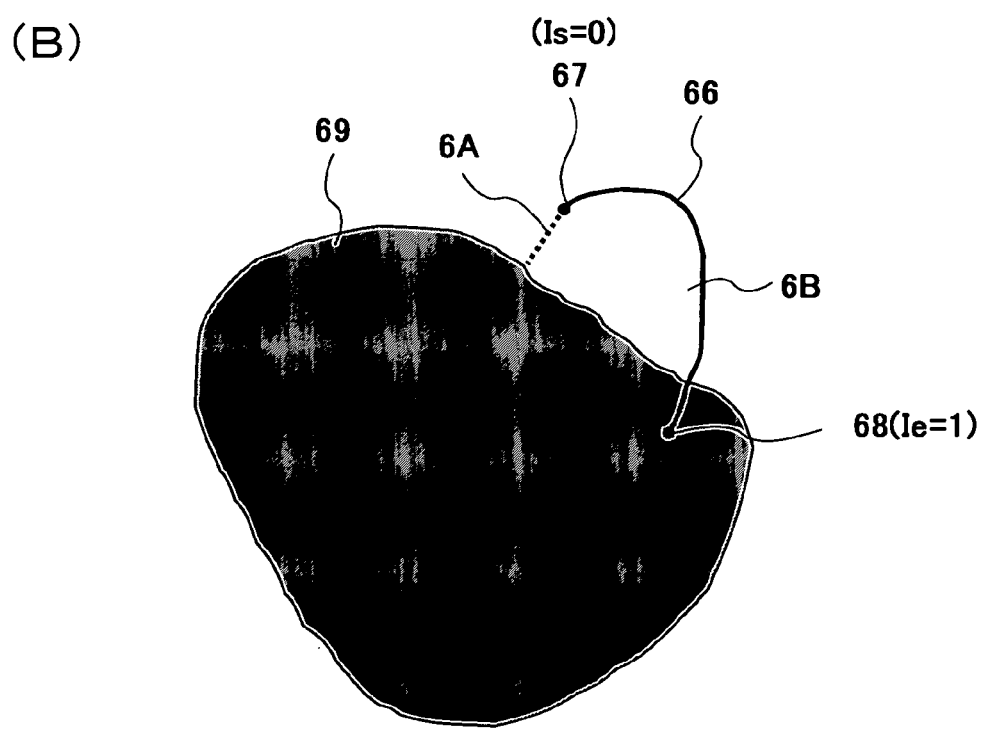

In the above-mentioned first embodiment, while it is set to end the procedure in step S35 without executing either region-deleting process nor region-adding process when $(I_s, I_e)=(0,1)$ or $(1,0)$, it may also be set to execute region-adding process even when $(I_s,I_e)=(0,1)$ or $(1,0)$ according to a method shown in FIG. 6.

FIG. 6 is a diagram showing an example of the region-adding process in the case that only the starting-point or ending-point is on the attention region. As seen in curve 62 of FIG. 6 (A) when each pixel value of starting-point 60 and ending-point 61 is $(I_s,I_e)=(1,0)$, the shortest distance between ending-point 61 and region 63 are connected with a line segment 64, and region 65 encompassed with curve 62, line segment 64 and region 63 is newly added to region 63.

On the other hand, as seen in curve 66 of FIG. 6 (B) when the respective pixel values of starting-point 67 and ending-point 68 are $(I_s,I_e)=(0,1)$ the shortest distance between starting-point 67 and region 69 are connected with line segment 6A if out of curve 66 the length of the section passing through pixel value "0" (outside of the region) exceeds r[%] compared to the entire length of curve 66, and region 69 encompassed with curve 66, line segment 6A and region 69 is newly added to region 69. If out of curve 66 the length of the section passing through pixel value "0" (outside of the region) is less than r[%] compared to the entire length of curve 66, the procedure will end without executing the region-adding process. The "r" is a predetermined constant number.

In place of obtaining the ratio between the entire length of the curve and the length of the curve passing through the outside of the region, by displaying the region encompassed with curve 66, line segment 6A and region 69 in a different color from the color of region 69, it may be set so that the region can be added by left-clicking mouse 26 when the operator determines that the region should be added and when it is determined that the region should not be added mouse 26 can be right-clicked not to add the region. While the case of adding the region is illustrated in FIG. 6, it also may be set so that the region can be deleted using the line segment connecting the shortest distance between the starting-point or ending-point and the contour of the region in the case that out of the curve the length of the section passing though the pixel value "1" (inside of the region) is more than r[%].

While the binary image wherein the pixel value "0" is given to the background region and the pixel value "1" is given to the drawn region with regard to the region-deleting or region-adding process, any number can be used for the respective pixel values as long as they are different numbers. Also, while an example that one closed region is deleted or added in relation to one drawn region is described, it can be set so that a plurality of regions can be added or deleted at once in relation to one drawn region.

Figure 7:
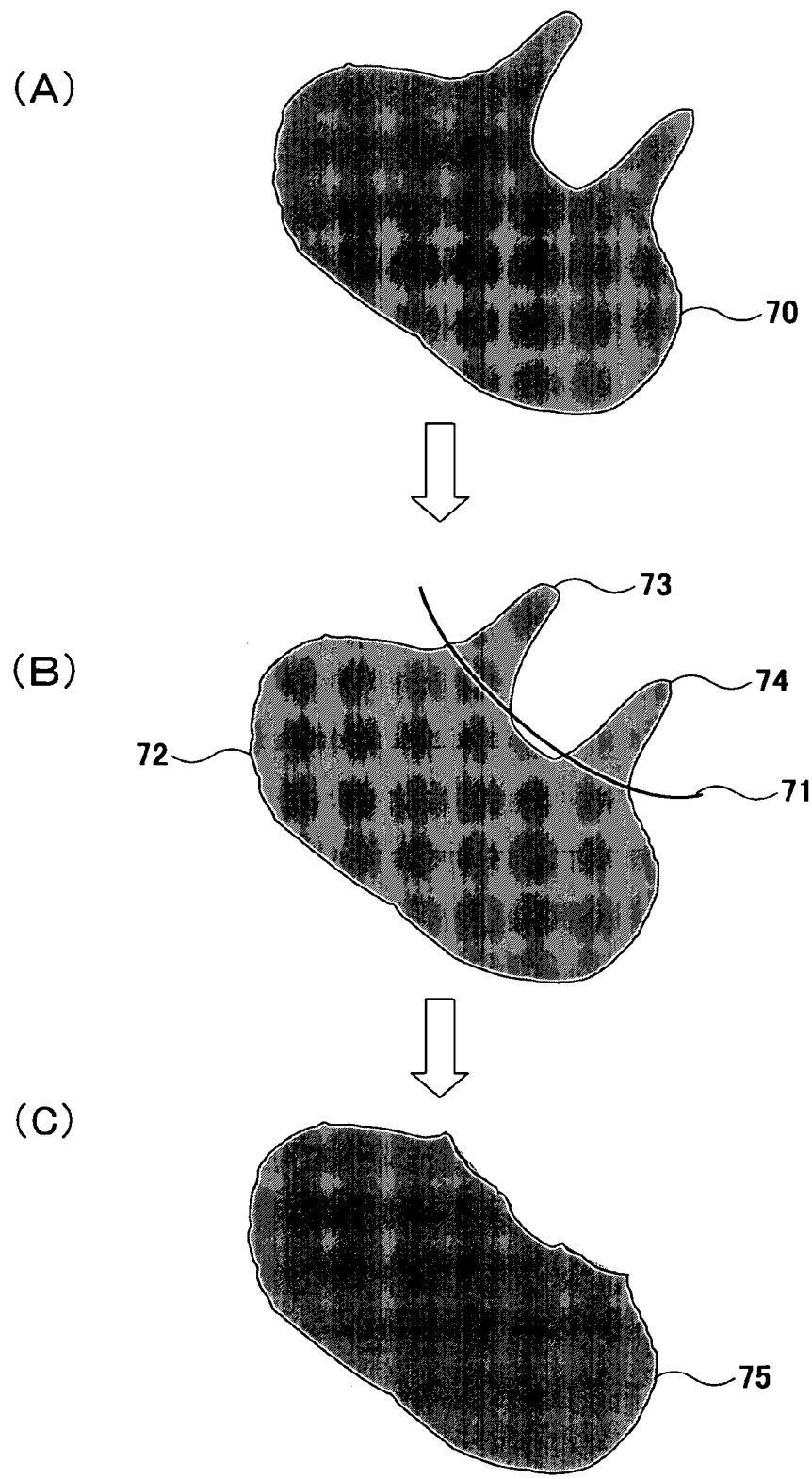
FIG. 7 is a diagram showing an example of the process to delete a plurality of regions at once in relation to one drawn-region.

FIG. 7 is a diagram showing an example of the process deleting a plurality of regions at once in relation to one drawn region. As seen in the diagram, the case of deleting two projection segments in relation to a region formed like region 70 will be described. First, curve 71 is plotted by an operator using mouse 15. The region-deleting process will be executed here since both ends of the curve are the background pixels. The respective area values with regard to three regions 72, 73 and 74 that are disconnected in segments by curve 71 are measured. Then the regions except the largest area among them are deleted. The region obtained as a result is as shown in region 75 of FIG. 7 (C) with the projection segments being deleted.

Figure 8:
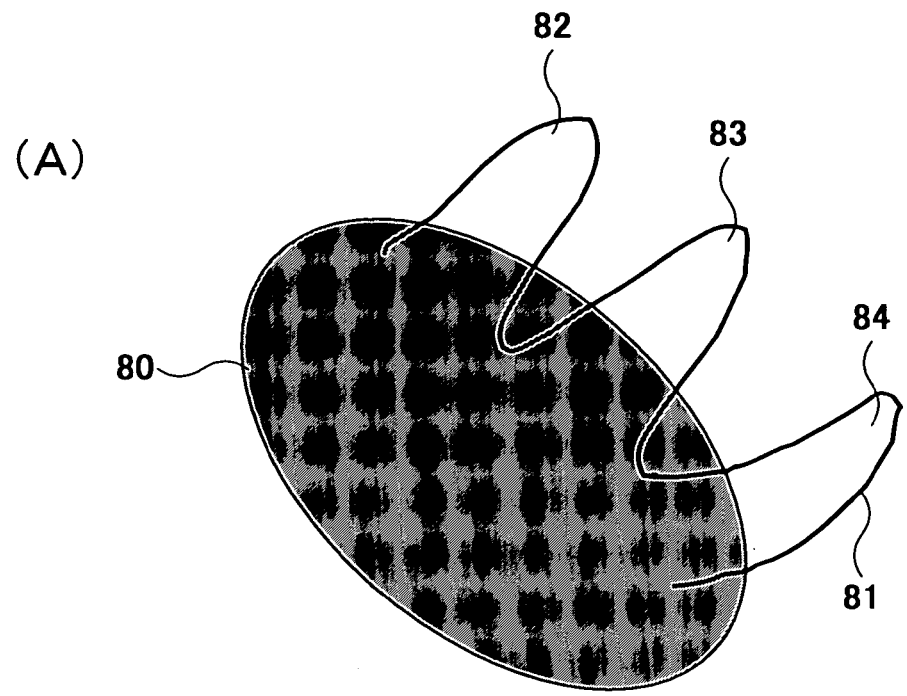
FIG. 8 is a diagram showing an example of the process to add a plurality of regions at once in relation to one drawn-region.
Figure 8:
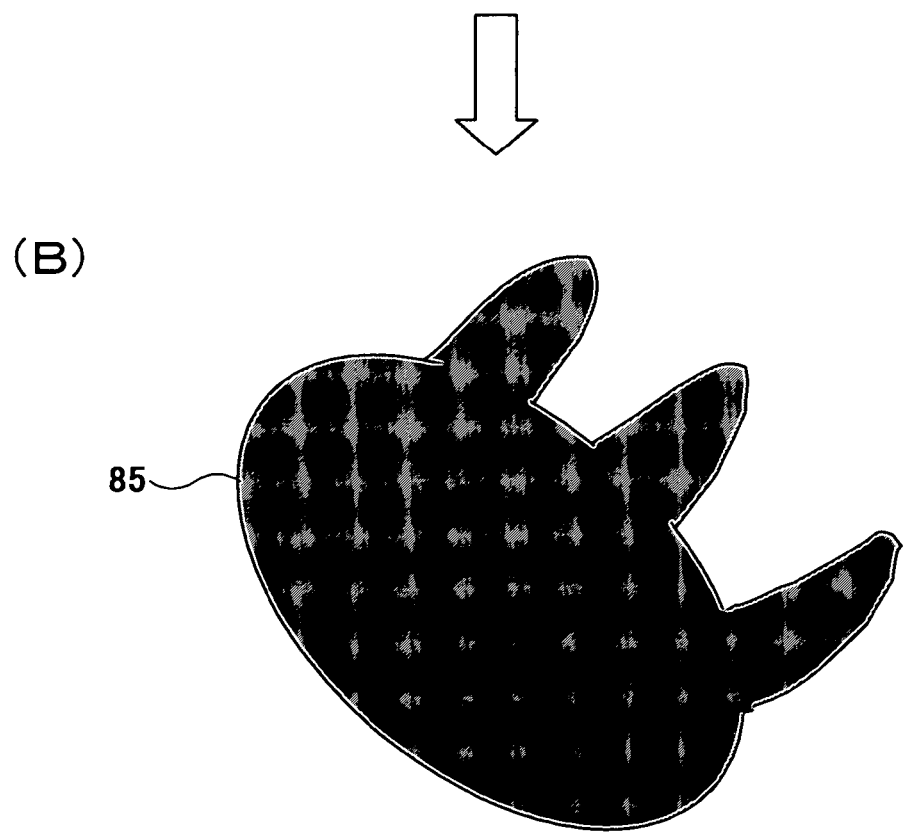

FIG. 8 is a diagram showing an example of the process for adding a plurality of regions at once in relation to one plotted image. Here the case of executing the region-adding process in relation to region 80 will be described as an example. The operator plots curve 81 as seen in FIG. 8 (A) using mouse 15. For both ends of the curve are inside of region 80, the region-adding process is to be carried out. A plurality of regions 82, 83 and 84 being encompassed with region 80 and curve 81 are newly added. The result of the region-adding process is as shown as region 85 in FIG. 8 (B).

Figure 9:
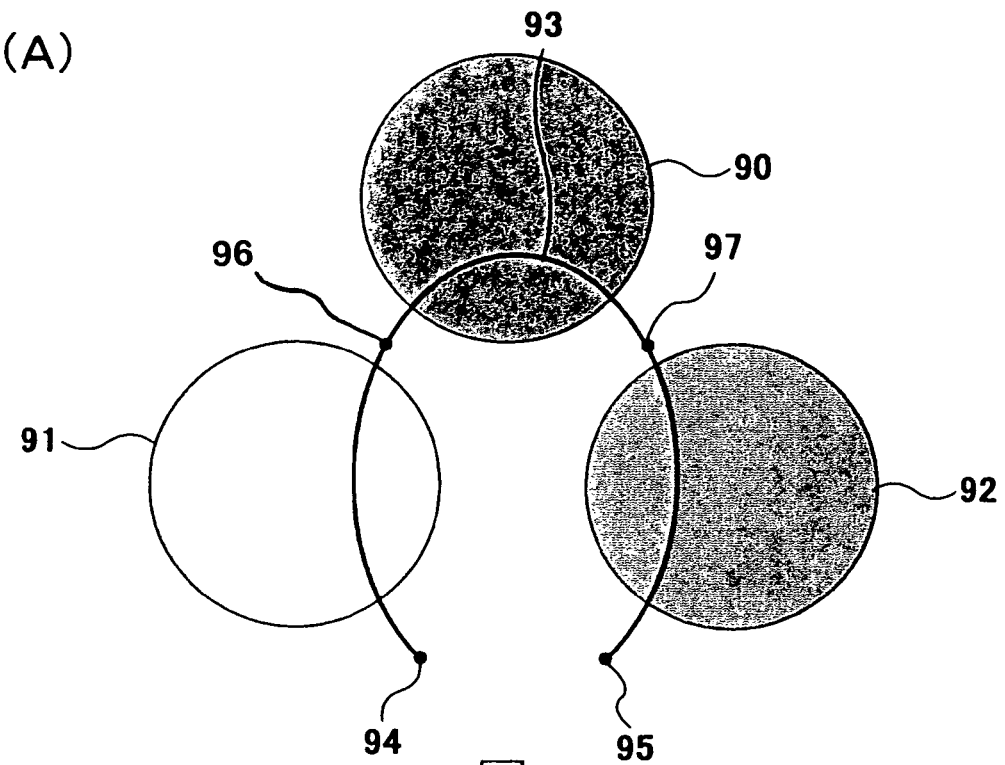
FIG. 9 is a diagram showing an example of the region-deleting process of a plurality of regions with different pixel values.
Figure 9:
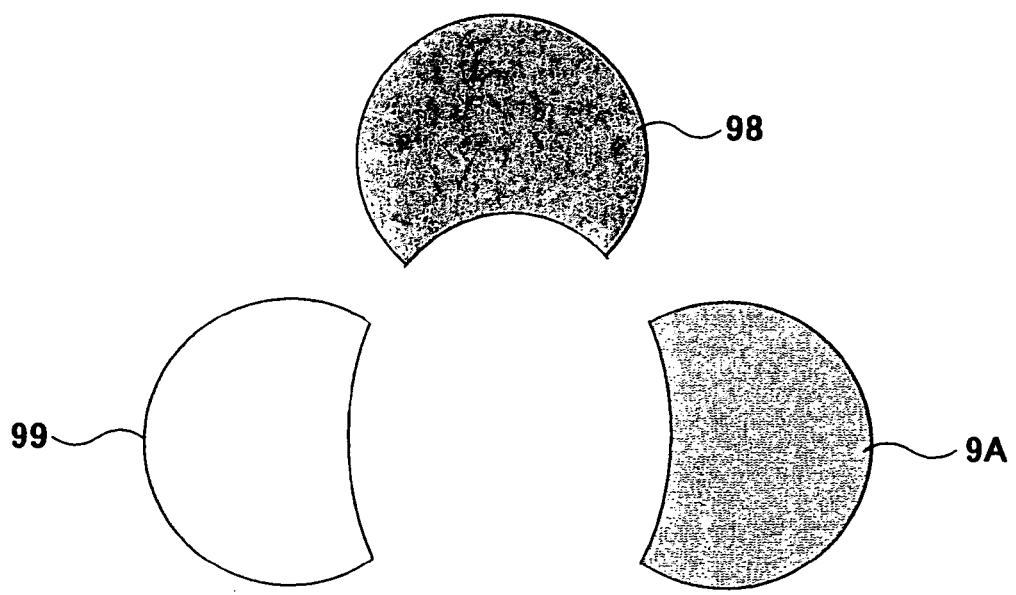

While the case with only one original region is described in the above-mentioned embodiment, the region-deleting process can be implemented at once in relation to a plurality of regions having different pixel values. FIG. 9 is a diagram showing an example of the region-deleting process for a plurality of regions. An operator plots curve 93 in relation to regions 90, 91 and 92 having the respectively different pixel values. Upon executing the deleting process on the region, both starting-point 94 and ending-point 95 of the curve should be positioned to be on the background region. On curve 93, a point between region 90 and region 91 is set as midpoint 96 and a point between region 90 and region 92 is set as midpoint 97. The region-deleting process of step S36 is executed using region 90 and the section from midpoint 96 to midpoint 97 of curve 93. The region-deleting process in step S36 is executed using region 91 and the section from starting-point 94 to midpoint 96 on curve 93. The region-deleting process in step S36 is executed using region 92 and the section from midpoint 97 to ending-point 95 of curve 93. The remained regions of the result from the steps above are shown as regions 98, 99 and 9A in FIG. 9 (B).

The Second Embodiment

Figure 10:
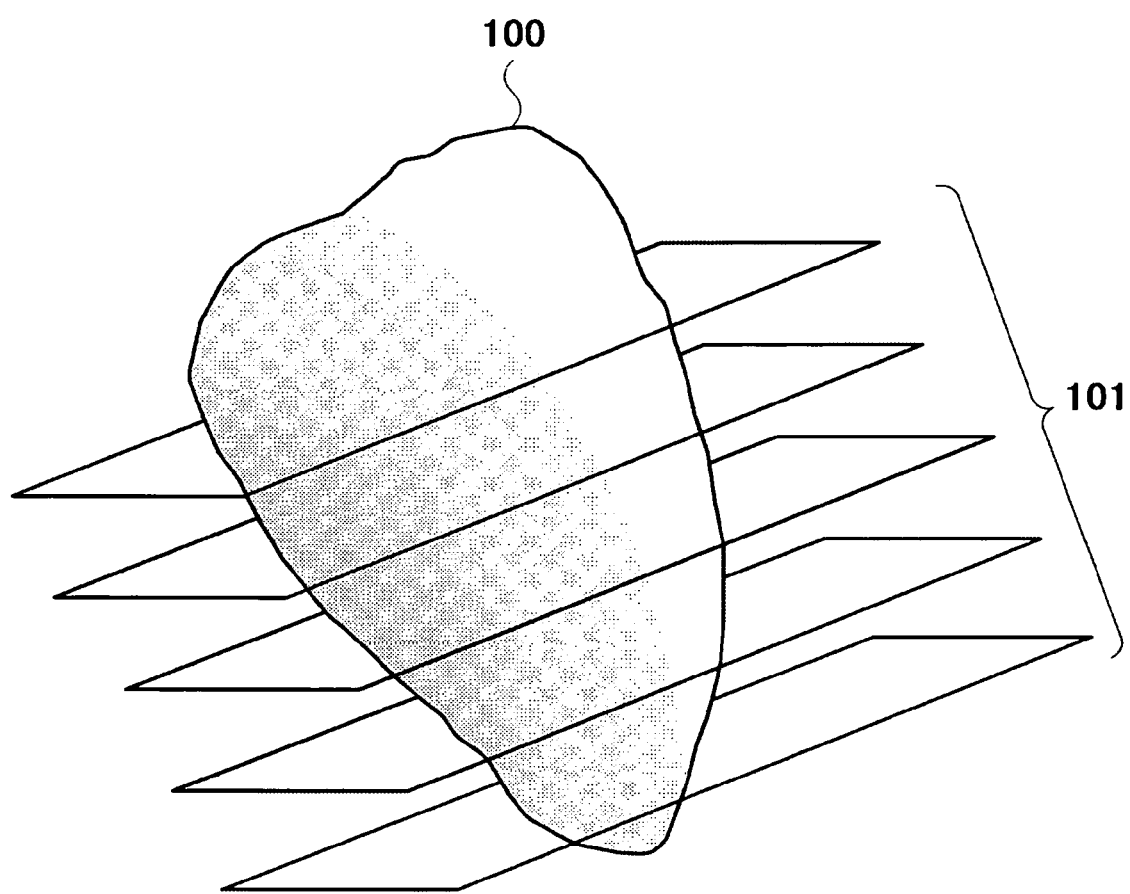
FIG. 10 is a pattern diagram representing the medical tomograms obtained by a medical tomograph such as X-ray CT or MR.
Figure 11:
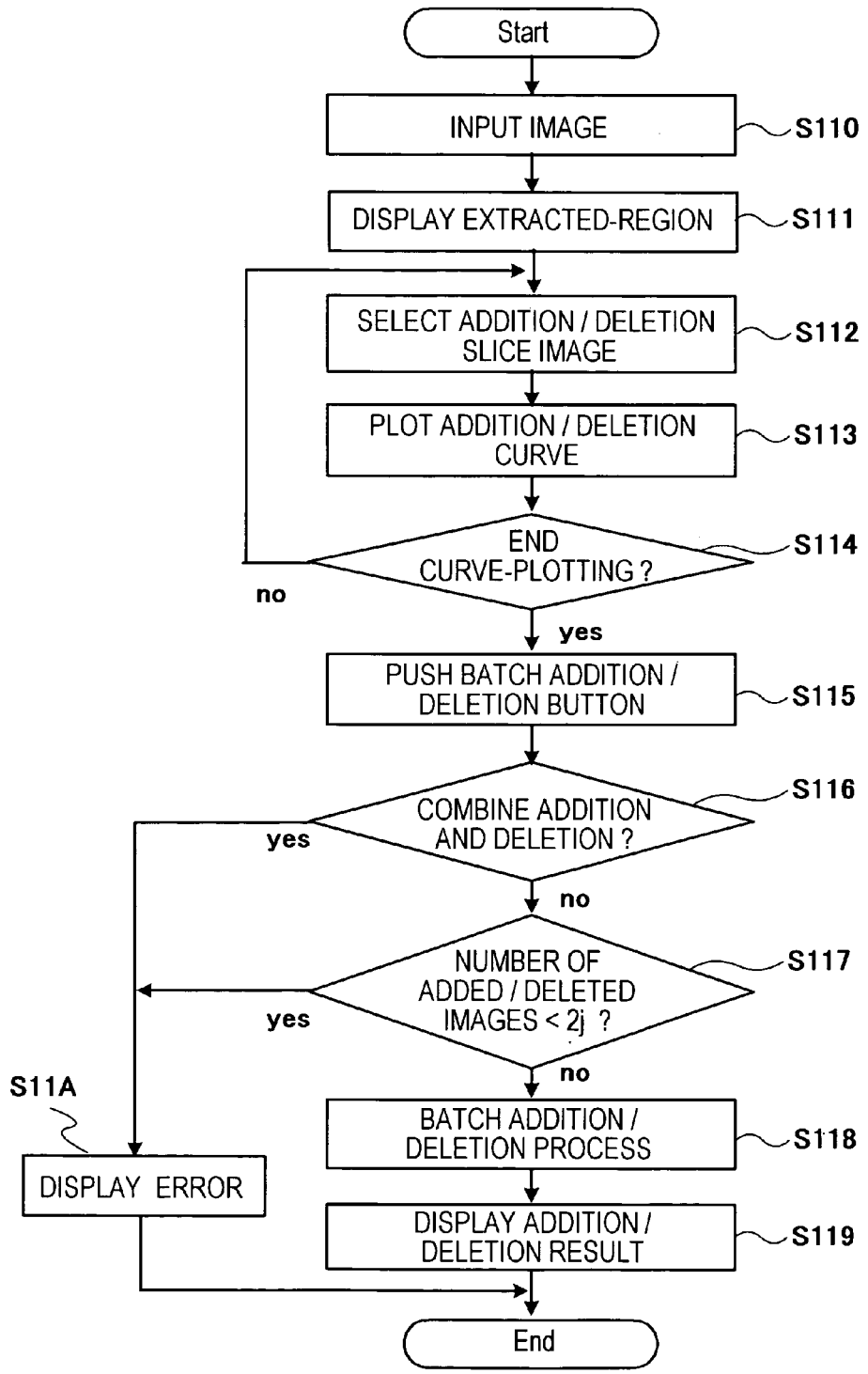
FIG. 11 is a flow chart showing the flow of the region-deleting process or region-adding process executed in relation to a plurality of medical tomograms.

While a case with only one drawn image is described in the above-mentioned embodiment, the case that there is, for example, a group of medical tomograms 101 obtained by a medical tomograph such as X-ray CT or MR as shown in FIG. 10 in relation to organ 100 will be described. An example for the case of creating a binary image extracting a target organ region with respect to each tomogram in a group of medical tomograms 101 will be described. FIG. 11 is a flow chart showing the flow of the region-deleting process or region-adding process executed with respect to a plurality of medical tomograms.

(Step S110)

An operator uses mouse 15 to push "read in" button 21 from the display screen shown in FIG. 2 and inputs a medical tomogram obtained by a medical tomograph and an image (binary image) on which the target organ region in the medical tomogram is extracted. Here, the extraction of the target organ region may be carried out either automatically or manually in the manner of tracing the contour.

(Step S111)

Figure 12:
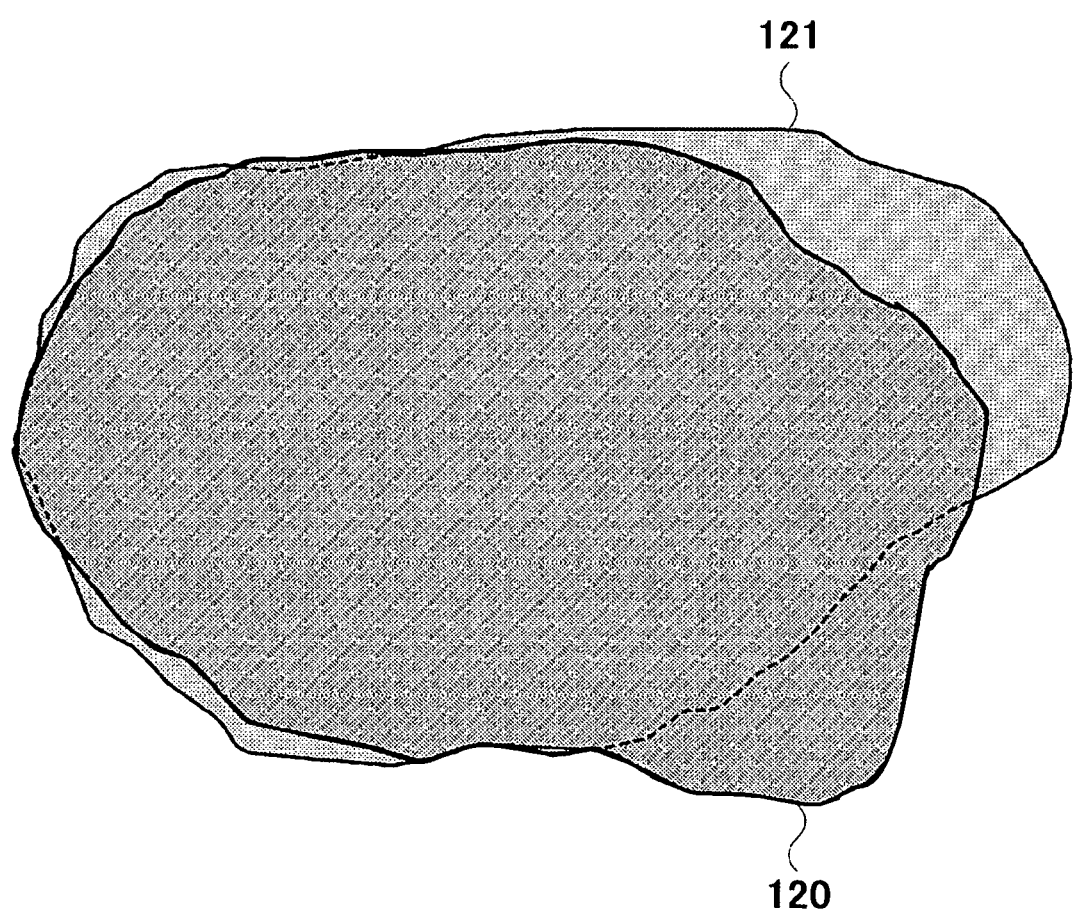
FIG. 12 is a pattern diagram illustrating the case of superimposing and displaying in translucence the organ region extracted on the medical tomograms.

Out of the group of inputted medical tomograms, one is displayed on image display region 22, and the extracted organ region is displayed on a medical tomogram, for example, by color-coding the region or in translucent colors as shown in region 120 of FIG. 12. This makes it possible to visually detect the extraction accuracy of the extracted region 120 in relation to the actual organ region 121, and to determine whether the region-adding process or region-deleting process should be executed.

(Step 112)

The operator uses scroll bar 26 for forwarding the images with mouse 15 or keyboard 17 to select and display an image slice for implementing the region-adding process or region-deleting process.

(Step S113)

Figure 13:
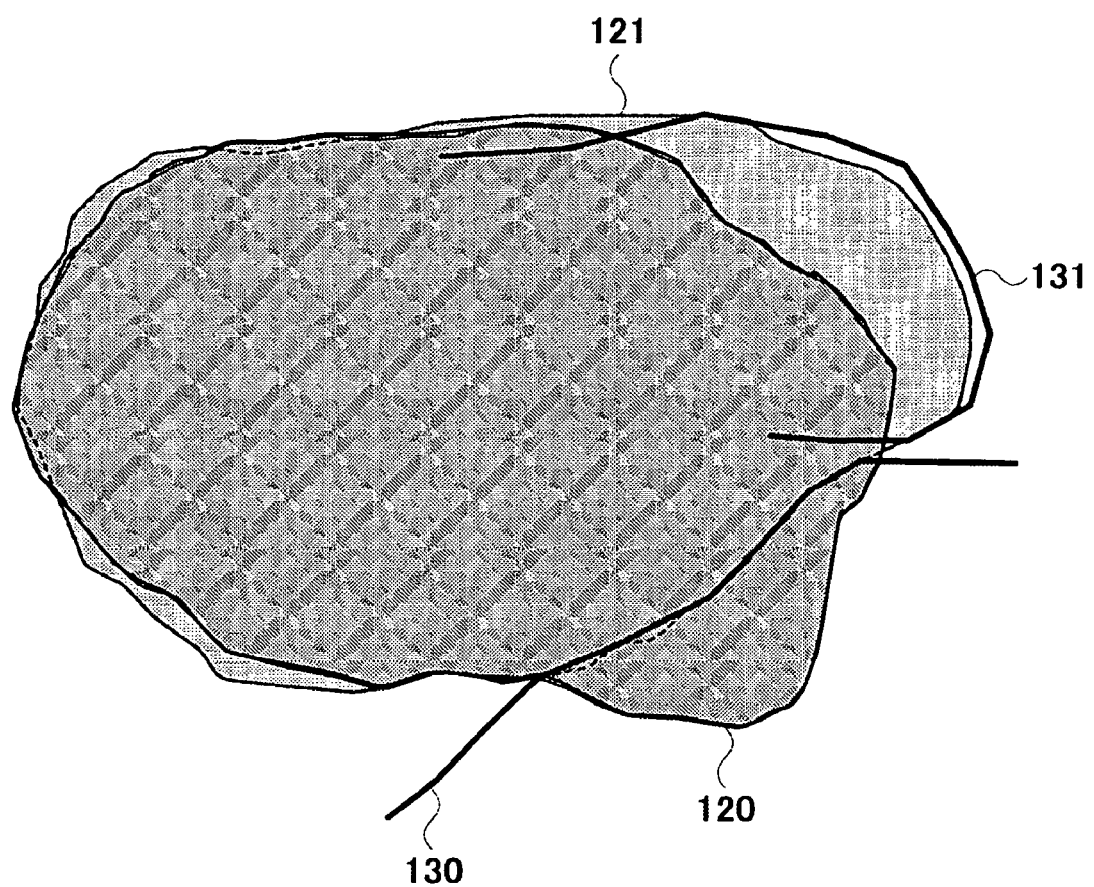
FIG. 13 is a diagram showing an example of the region-adding curve and the region-deleting curve displayed on medical tomograms.

The operator plots a curve on image display region 22 for adding or deleting the region with the use of mouse 15. This curve should be plotted in the manner shown in curve 130 or curve 131 in FIG. 13. Here if both ends (the starting-point and ending-point) of curve 130 are on the outside of the extraction region the curve is referred to as the region-deleting curve, and if both ends (the starting-point and ending-point) are on the inside of the extraction region the curve is referred to as the region-adding curve.

(Step S114)

The operator plots a region-adding curve or region-deleting curve with respect to the discretional number of images out of a plurality of inputted extraction regions of the medical tomograms. If the plotting of the curve is not finished the process will returned to step S112 and the image for plotting the curve will be selected, and if curve-plotting with respect to the discretional number of images is completed step S115 is to proceed. The curve plotted in relation to the discretional number of images here is to use for the batch region-adding/deletion process that will be described in step S118.

(Step S115)

The operator pushes "batch addition/deletion" button 28 using mouse 15.

(Step S116)

Figure 14:
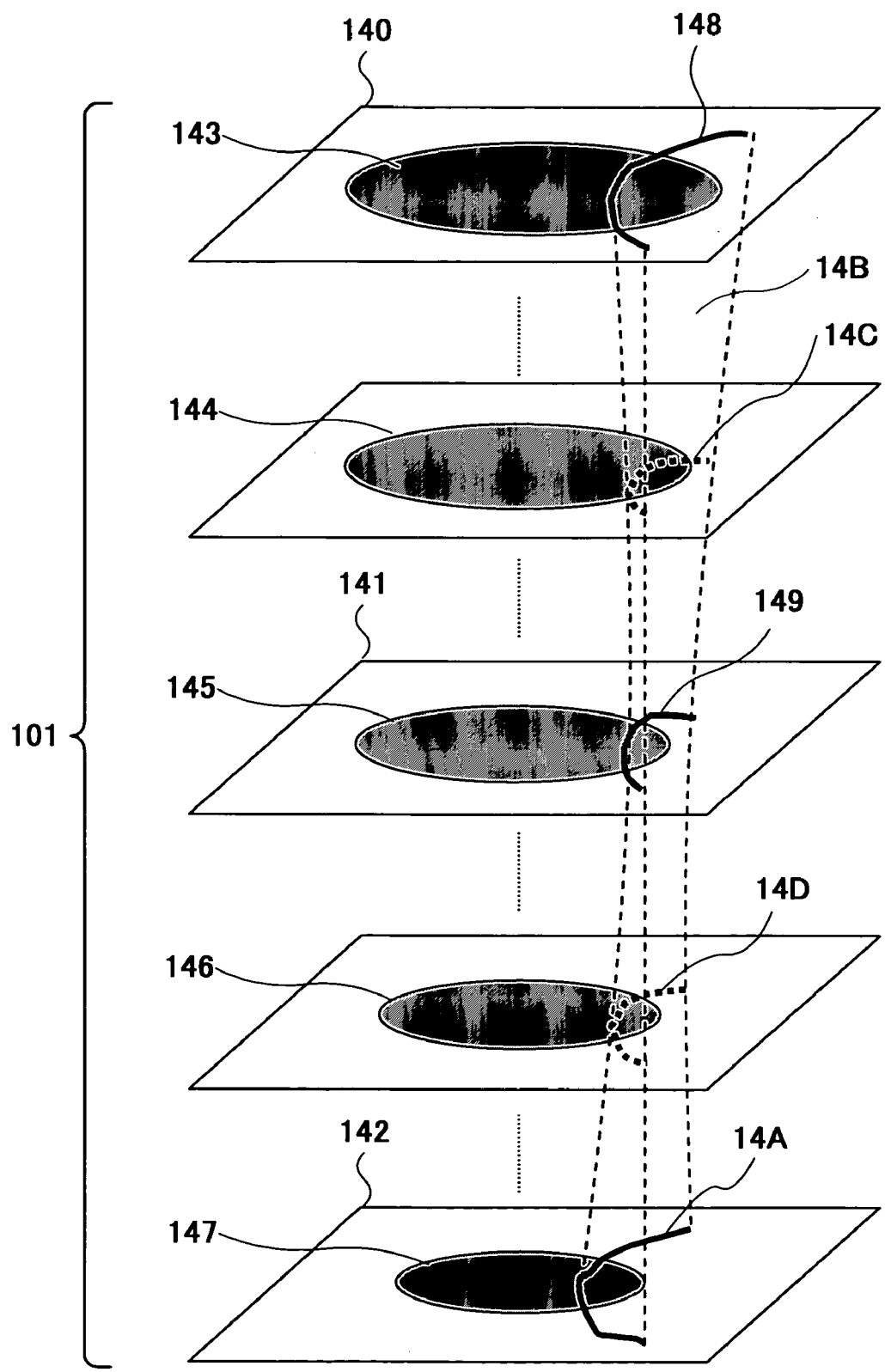
FIG. 14 is a first diagram for illustrating the batch region-deleting process being executed by the region-deleting curves of a plurality of medical tomograms.
Figure 15:
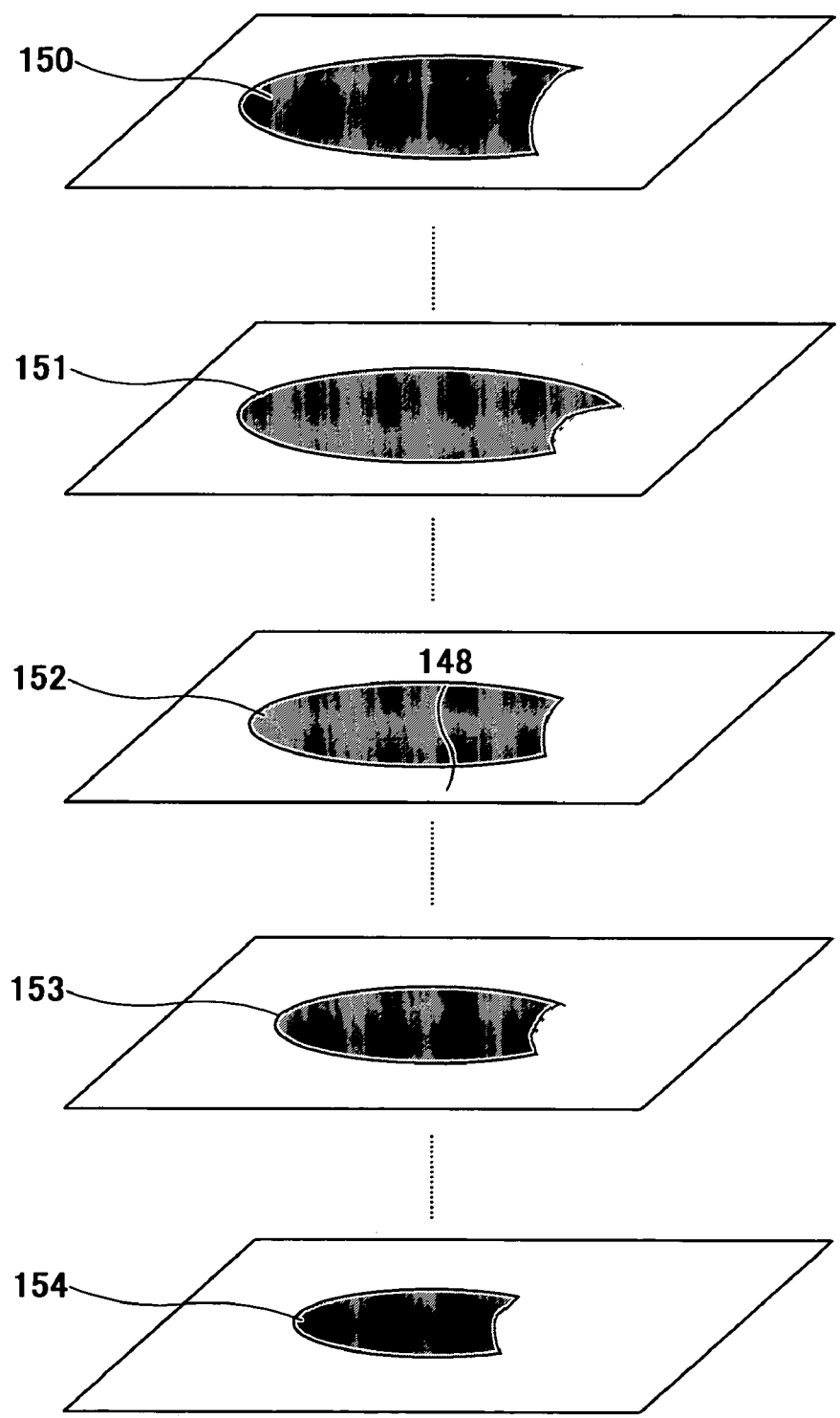
FIG. 15 is a second diagram illustrating the batch region-deleting process being executed by the region-deleting curves of a plurality of medical tomograms.
Figure 16:
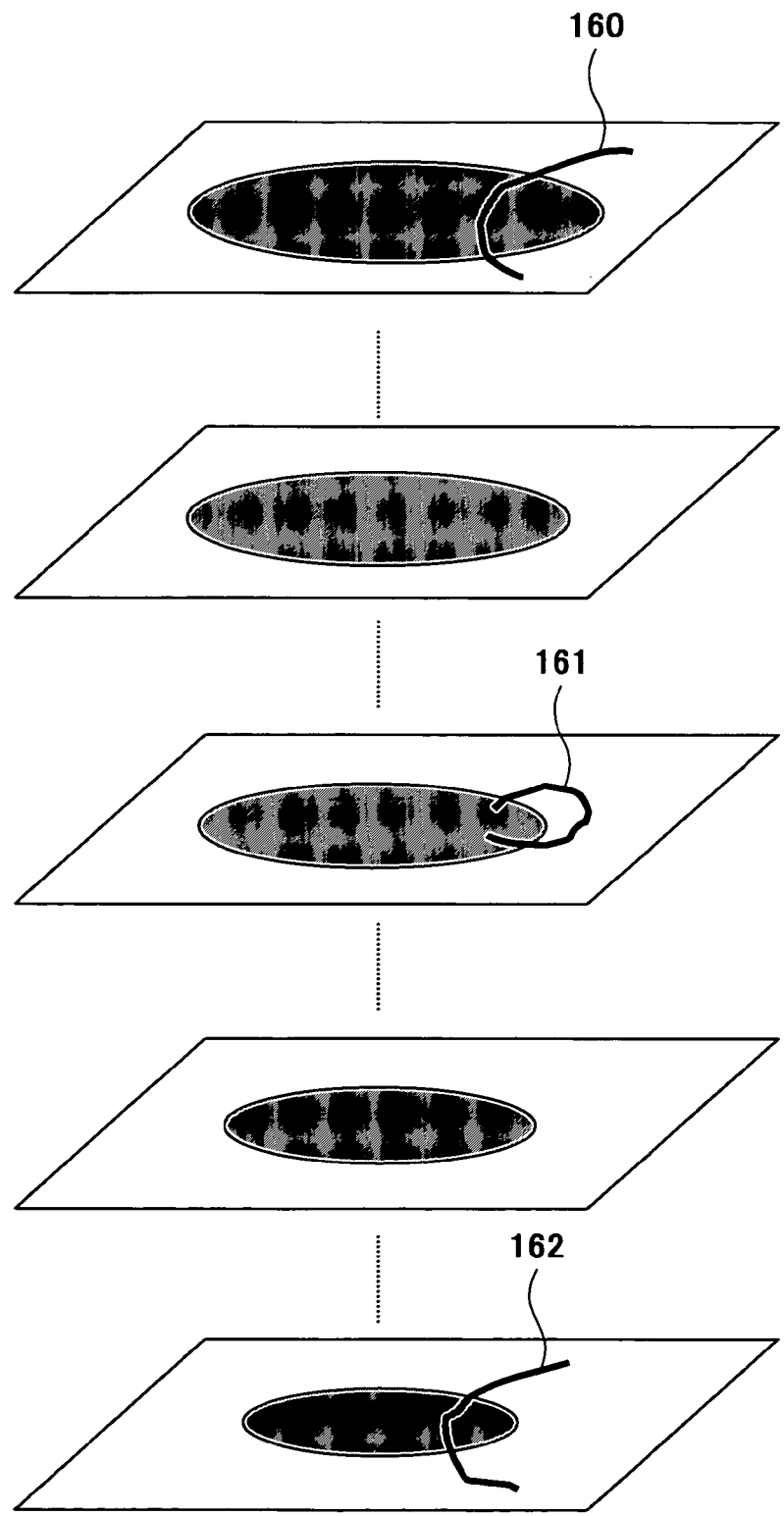
FIG. 16 is a diagram showing an example of the case that the two curves of the region-adding curve and region-deleting curve exist in the medical tomograms.

A pattern diagram of the region-adding curve or region-deleting curve plotted in step S113 are shown in FIG. 14. Here, the case of applying curve plotting in step S113 to 3 pieces of image 140, 141 and 142 out of a group of image tomograms 101 will be described as an example. Regions 143-147 are binarized organ regions. Curves 148, 149 and 14A are the plotted curves. CPU 10 searches for the pixel value of both ends (starting-point and ending-point) of curves 148, 149 and 14A and judges whether the respective curves are region-adding curve or region-deleting curve. In the case that there are both region-adding curves and region-deleting curves as seen in curves 150, 151 and 152 of FIG. 15 step S11A is to proceed, and in the case there is only one of them as seen in curves 148, 149 and 14A of FIG. 14 step S117 is to proceed.

(Step S117)

CPU 10 measures the number of images on which the region-adding curve or region-deleting curve is plotted. In the case of FIG. 14, the number of images is three. If this number is less than 1 step S11A is carried out, and if more than two, step S118 is carried out.

(Step S118)

CPU 10 executes the batch region-adding process if the plotted curve is the region-adding curve, and executes the batch region-deleting process if the plotted curve is the region-deleting curve. The batch adding/deleting process is carried out in the following manner.

Curved surface 14B to include all of the plotted curves (curves 148, 149 and 14A in case of FIG. 14) is obtained by a curve interpolation process such as the spline interpolation, Bezier interpolation or tertiary curve interpolation. Curve 14B may be obtained by the linear interpolation if there are only two plotted curves. It is preferable to determine the distance between the medical tomograms to be isotropic taking the factors such as the length per pixel in the tomogram into consideration. Curves 14C and 14D which the respective cross-sections including regions 144, 146 and curved surface 148 intersect with each other are obtained. In this manner the region-deleting curves (or region-adding curves) 148, 149, 14A, 14C and 14D, are obtained from the respective tomograms. The regions with smaller area of the regions divided in two by these curves are deleted. As a result, the obtained regions turnout to be in the same manner as regions 150-154 shown in FIG. 15. If the curve plotted in step S113 is the region-adding curve, curve 14B is obtained in the same manner, and when the region-adding curve is obtained in all of the tomograms, the regions encompassed by those curves and the original regions are newly added.

(Step S119)

CPU 10 displays in translucence the new regions obtained by the region-deleting process or region-adding process to image display region 22 superimposing over medical tomograms.

(Step S11A)

Cases where both region-deleting curve and region-adding curve exist, either of them exists, or only one exists are notified to the operator by display of an error massage or the sound indicating of an error since batch region-adding process or batch region-deleting process cannot be executed.

Figure 17:
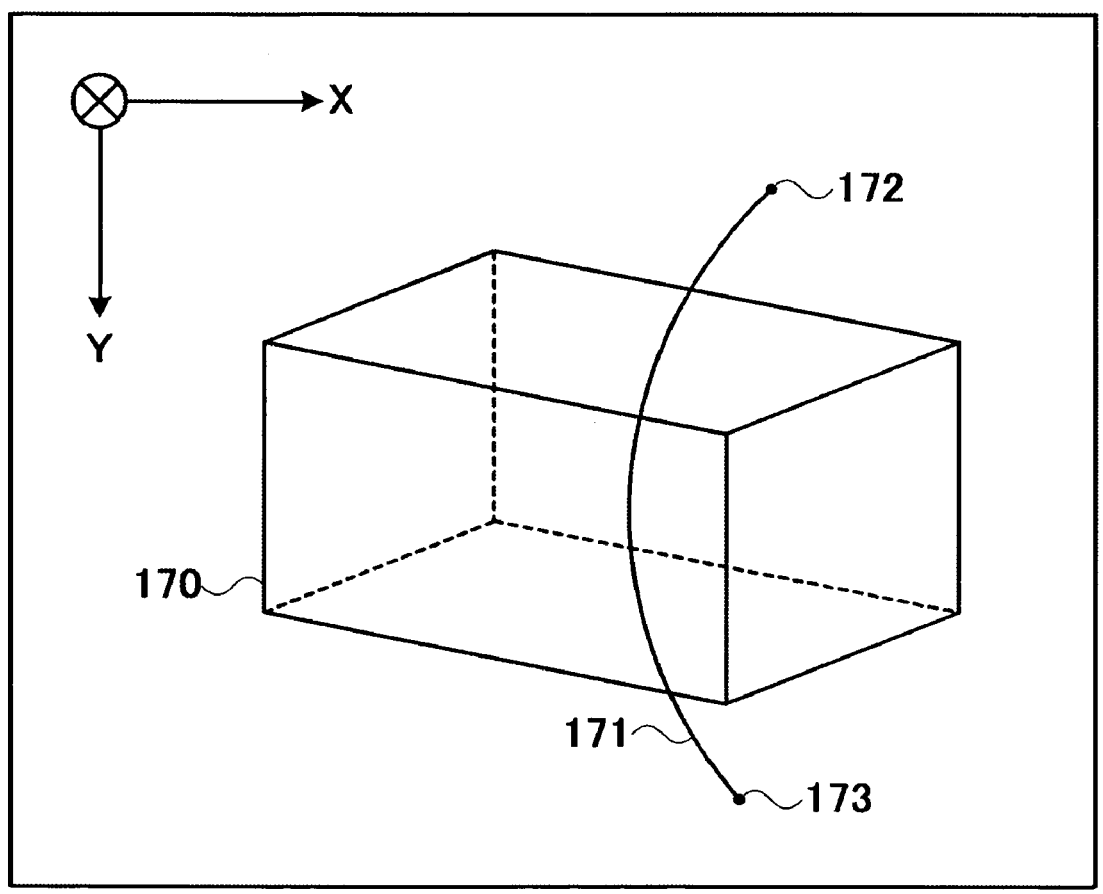
FIG. 17 is a diagram showing an example of the region-deleting process of a three-dimensional image.

While two-dimensional images have been taken as examples so far, the same method can be used for the region-deleting process of three-dimensional images. FIG. 17 is a diagram showing an example of a region-deleting process of a three-dimensional image. As shown in FIG. 17, rectangular solid 170 is a three-dimensional image displayed on a two-dimensional image. An operator plots curve 171 using mouse 15 on the above-mentioned image. When both starting-point 172 and ending-point 173 of curve 171 are on the outside of three-dimensional image 170, the region-deleting process is carried out. As shown in FIG. 17, X-axis is set in the right direction on the display image, Y-axis is set downward, and Z-axis in depth direction vertical to the display image. In order to cut off the three-dimensional image, there is a need to create a cross section thereof. Across section is created based on curve 171 plotted by the operator. The surface to which curve 171 is being extended in the direction of Z-axis is set as the cut surface, and out of two three-dimensional regions being cut off by this curve surface, the one with smaller solid measure is deleted. Here, in stead of the smaller solid measure being deleted automatically, it may be set so that each of the two three-dimensional regions are displayed with different colors and the region that the operator wishes to delete would be deleted by clicking mouse 15 on the region. Instead of clicking mouse 15 on the region to be deleted, it may naturally be set so that the discretional region can be remained by being clicked on it.

In accordance with the image-editing/display method and device, image drawing or correction such as deletion or addition can be carried out by simple operation.

While the examples which used curves to explain the new regions are described in the respective above-mentioned embodiments, the graphics such as straight line, quadrangle, circle or arc that are in the graphic plotting software may be used instead. Because there is an essential need that the above-mentioned curve must be set along the contour, the operationality for resetting a new attention region will further be improved if the above-mentioned respective graphics are set to be selectable in a menu format.

In accordance with the image-editing device and method of the present invention, it is possible to carry out corrections such as deletion or addition of the drawing area of the desired images with simple operation in relation to the images displayed on the screen by operating an input device such as a mouse.

The invention claimed is:

1. A medical image-editing device comprising:
a source of a pixel-based medical image;
a computer-implemented display configured to display a plurality of pixel value regions of said pixel-based medical image including an attention region of said medical image and at least one other region of said medical image, said other region of the medical image being different from said attention region;
a computer-implemented setting unit configured to set a graphic passing through the attention region and said at least one other region of the medical image and having ending points; and
a computer-implemented control configured to determine which of said attention and other regions contains the ending-points of the set graphic, to execute either extension or deletion on the attention region of the medical image according to the result of the determination and the graphic, and to cause the display to display the attention region on which the extension or deletion is executed as a new attention region of said pixel-based medical image,
wherein when the medical image-editing device has determined that one of the ending points of said graphic is in the attention region and the other one of the ending points is in said other region, the control of the medical image-editing device executes either the extension or the deletion to extend or delete the attention region based on a ratio between (i) an entire length of the graphic and (ii) a length of the graphic passing through the attention region or the other region.

2. The image-editing device according to claim 1, wherein the setting unit is configured to set said graphic to pass through the attention region and at least one background region of the medical image to plot.

3. The image-editing device according to claim 1, wherein the control is configured to extend the attention region to the position of said graphic when it is determined that the ending-points of the graphic set by the setting unit are concurrently in the attention region of said medical image.

4. The image-editing device according to claim 1, wherein the control is configured to delete a portion of the attention region segmentized by said graphic when it is determined that the ending-points of the graphic set by the setting unit are concurrently in said other region of said medical image.

5. The image-editing device according to claim 1, wherein the control is configured, when it is determined that one of the ending-points of said graphic is in the attention region and the other one of the ending points is in said other region, to extend or delete the attention region based on at least one of the positions of the ending-points of the graphic relative to said other region and the length of the graphic in a predetermined direction.

6. The image-editing device according to claim 5, wherein the control is configured, with regard to at least one of the distances between a plurality of ending-points of the graphic and the length of the graphic in a predetermined direction, to extend the attention region if the proportion of the distance or length of the section of the graphic passing through the attention region exceeds a predetermined ratio.

7. The image-editing device according to claim 5, wherein the control is configured, with regard to at least one of the distances between a plurality of ending-points of the graphic and the length of the graphic in a predetermined direction, to delete the attention region if the proportion of the distance or length of the section of the graphic passing through the attention region is less than a predetermined ratio.

8. The image-editing device according to claim 1, wherein the control is configured to cause the display of the attention region and a background region of the medical image with different colors in relation to said medical image or in relation to a plurality of medical images of an object.

9. The image-editing device according to claim 1, wherein the control is configured to cause the display of the attention region in a translucent color over said medical image or over a plurality of medical images of an object.

10. A medical image-editing device comprising:
a computer-implemented display configured to extract and display an attention region and a background region with regard to a plurality of tomograms of an object;
a computer-implemented line-plotting unit configured to plot a line having a starting point and an ending point and passing through both of the attention region and the background region with regard to at least two of the plurality of tomograms;
a computer-implemented judging unit configured to judge which of the attention region and the background region contains the starting-point and ending-point of the plotted line with regard to said at least two of the plurality of tomograms;
a computer-implemented determination unit configured to determine that the plotted line is a region-adding line if both of the starting-point and ending-point of the plotted line are in the attention region, but that the plotted line is a region-deleting line if both of the starting-point and ending-point of the plotted line are in the background region;
a computer-implemented surface creation unit configured to respond to a determination by the determination unit that the plotted line in relation to the at least two tomograms is the region-adding line or the region-deleting line, and to create a surface using a curve approximation method including the plotted line in relation to said at least two tomograms;
a computer-implemented image-editing unit configured to set as a respective region-adding line or a region-deleting line an intersection of the created surface with additional ones of said plurality of tomograms, on which additional tomograms the line-plotting unit has not plotted a region-adding line or a region-deleting line, and to extend or delete the attention region in the plurality of said additional tomograms according to the region-adding line or the region-deleting line set according to said intersection; and
wherein said display is further configured to display the attention region of each of a plurality of said tomograms, after the extending or deleting by said image-editing unit, superimposed in translucent color over the respective tomogram.

11. A medical image-editing method including:
   a step for displaying a medical image having a plurality of pixel value regions including an attention region and another region;
   a step for setting, utilizing a medical image-editing device, a graphic passing through the attention region and said another region of the medical image, said graphic having ending points;
   a step for determining, by the medical image-editing device, which of said attention region and said another region contains the ending points of the set graphic;
   a step for executing, by the medical image-editing device, either an extension or a deletion of the attention region according to the graphic and the result determined by the determination step; and
   a step for displaying the extended or deleted attention region of said medical image as a new attention region,
   wherein when the medical image-editing device has determined in the step for determining that one of the ending points of said graphic is in the attention region and the other one of the ending points is in said other region, the medical image-editing device, in the step for executing, executes either the extension or the deletion of the attention region based on a ratio between (i) an entire length of the graphic and (ii) a length of the graphic passing through the attention region or the other region.

12. The image-editing method according to claim 11, wherein the setting step sets said another region as a background region on the image, and plots a graphic passing through the background region and the attention region.

13. The image-editing method according to claim 11, wherein the executing step executes an extension of the attention region to the position of said graphic when the determination step determines that the ending-points of the graphic set by the setting step exist concurrently in the attention region.

14. The image-editing method according to claim 12, wherein the executing step executes a deletion the portion of the attention region segmentized by said graphic when the determination step determines that the ending-points of the graphic set by the setting step exist concurrently in the background region, deletes a portion of the attention region segmentized by said graphic.

15. The image-editing method according to claim 11, wherein when the determination step has determined that one of the ending-points set by the setting step exists in the attention region and the other ending point exists in said another region, the executing step executes either extension or deletion of the attention region based on at least one of the position of said graphic relative to said another region and a length of said graphic in a predetermined direction.

16. The image-editing method according to claim 15, wherein the executing step extends the attention region when the proportion of the distance or length of the segment passing through the attention region with regard to at least one of the distance between the ending-points of the graphic or the length of the graphic in a predetermined direction exceeds a predetermined ratio.

17. The image-editing method according to claim 15, wherein the executing step deletes the attention region when the proportion of the distance or length of the segment passing through the attention region with regard to at least one of the distance between the ending-points of the graphic or the length of the graphic in a predetermined direction is less than a predetermined ratio.

18. The image-editing method according to claim 11, wherein the displaying step displays the attention region and said another the background region with different colors in relation to said medical image or to a plurality of medical images of an object.

19. The image-editing method according to claim 11, wherein the displaying step displays the attention region in translucent color on said medical image or on a plurality of medical images of an object.

20. A computer-implemented medical image-editing method comprising:
   a display step for extracting, by a medical image-editing device, and displaying attention regions relative to background regions in relation to a plurality of tomograms of an object;
   a line-plotting step for plotting respective lines passing through both the attention region and the background region in relation to at least two out of the plurality of tomograms;
   a judgment step for judging, by the medical image-editing device, whether the attention region or the background region contains a starting-point and ending-point of the respective lines plotted in relation to said at least two tomograms;
   a determination step for determining, by the medical image-editing device, each of the respective lines as a region-adding line when it is judged in the judging step that the starting-point and ending-point of the plotted line exist concurrently in the attention region of the respective tomogram, and as a region-deleting line when it is judged that the starting-point and ending-point of the plotted line exist concurrently in the background region of the respective tomogram;
   a surface creation step, executed by the medical image-editing device when the medical image-editing device has determined in the determination step that each of the respective lines plotted in relation to said at least two tomograms is either the region-adding line or the region-deleting line, for creating a surface using a curve approximation method including the plotted lines in relation to said at least two tomograms;
   an image-editing step for setting, by the medical image-editing device, the intersection of said surface with each respective tomogram of said plurality of tomograms that are in addition to said at least two tomograms as the region-adding line or the region-deleting line of the respective one of said additional tomograms, and extending or deleting the attention region in the respective tomogram according to the region-adding line or the region-deleting line defined by said intersection; and
   a display step for displaying the attention regions after the extending or the deleting thereof in said image-editing step by superposing each attention region in translucent color over the respective tomogram.

* * * * *